United States Patent [19]

Goodrich et al.

[11] Patent Number: 4,887,780

[45] Date of Patent: Dec. 19, 1989

[54] ORBITER ESCAPE POLE

[75] Inventors: Winston D. Goodrich, Houston; Clarence J. Wesselski, Alvin; Timothy E. Pelischek, League City; Bruce H. Becker, League City; Jon B. Kahn, League City, all of Tex.; Margaret E. Grimaldi, West St. Paul, Minn.; John P. McManamen, Houston; Edgar O. Castro, Bryan, both of Tex.

[73] Assignee: The United States of America as represented by the Administrator of the National Aeronautics and Space Administration, Washington, D.C.

[21] Appl. No.: 292,046

[22] Filed: Dec. 30, 1988

[51] Int. Cl.⁴ .............................................. B64D 25/08
[52] U.S. Cl. .................................. 244/137.2; 244/905; 244/138 R
[58] Field of Search ............. 244/138 R, 137.1, 137.2, 244/137.3, 147, 905; 182/48, 189

[56] References Cited

U.S. PATENT DOCUMENTS

| | | | |
|---|---|---|---|
| 927,148 | 7/1909 | Jay | 182/189 |
| 1,799,376 | 4/1931 | Kelley . | |
| 2,331,309 | 10/1943 | Corriston | 244/137.2 |
| 2,404,195 | 7/1946 | Schlieber | 244/137.1 |
| 2,441,367 | 5/1948 | Noville | 244/137.1 |
| 2,658,702 | 11/1953 | Osborne | 244/137.2 |
| 2,801,062 | 7/1957 | Leahy et al. | 244/137.2 |
| 2,845,240 | 7/1958 | Marshall | 244/137.3 |
| 2,965,193 | 12/1960 | Murphy | 182/189 |
| 3,325,125 | 6/1967 | Cooper et al. | 244/138 |
| 3,339,690 | 9/1967 | Craig | 182/48 |
| 3,358,950 | 12/1967 | Welsch et al. | 244/137.2 |
| 4,437,630 | 3/1984 | Jefferies | 244/136 |
| 4,645,147 | 2/1987 | Hendricks | 244/137.2 |
| 4,776,532 | 10/1988 | Haltbrekker | 244/137.2 |

Primary Examiner—Galen Barefoot
Attorney, Agent, or Firm—Russell E. Schlorff; John R. Manning; Edward K. Fein

[57] ABSTRACT

A Shuttle type of aircraft (10) with an escape hatch (12) has an arcuately shaped pole housing (16) attachable to an interior wall and ceiling with its open end adjacent to the escape hatch. The pole housing 16 contains a telescopically arranged and arcuately shaped primary pole member (22) and extension pole member (23) which are guided by roller assemblies (30,35). The extension pole member (23) is slidable and extendable relative to the primary pole member (22). For actuation, a spring actuated system includes a spring (52) in the pole housing. A locking member (90) engages both pole members (22,23) through notch portions (85,86) in the pole members. The locking member selectively releases the extension pole member (23) and the primary pole member (22). An internal one-way clutch or anti-return mechanism prevents retraction of the extension pole member from an extended position. Shock absorbers (54)(150,152) are for absorbing the energy of the springs.

A manual backup deployment system is provided which includes a canted ring (104) biased by a spring member (108). A lever member (100) with a slot and pin connection (102) permits the mechanical manipulation of the canted ring to move the primary pole member. The ring (104) also prevents retraction of the main pole.

The crew escape mechanism includes a magazine (60) and a number of lanyards (62), each lanyard being mounted by a roller loop (68) over the primary pole member (22). The strap on the roller loop has stitching for controlled release, a protection sheath (74) to prevent tangling and a hook member (69) for attachment to a crew harness.

22 Claims, 5 Drawing Sheets

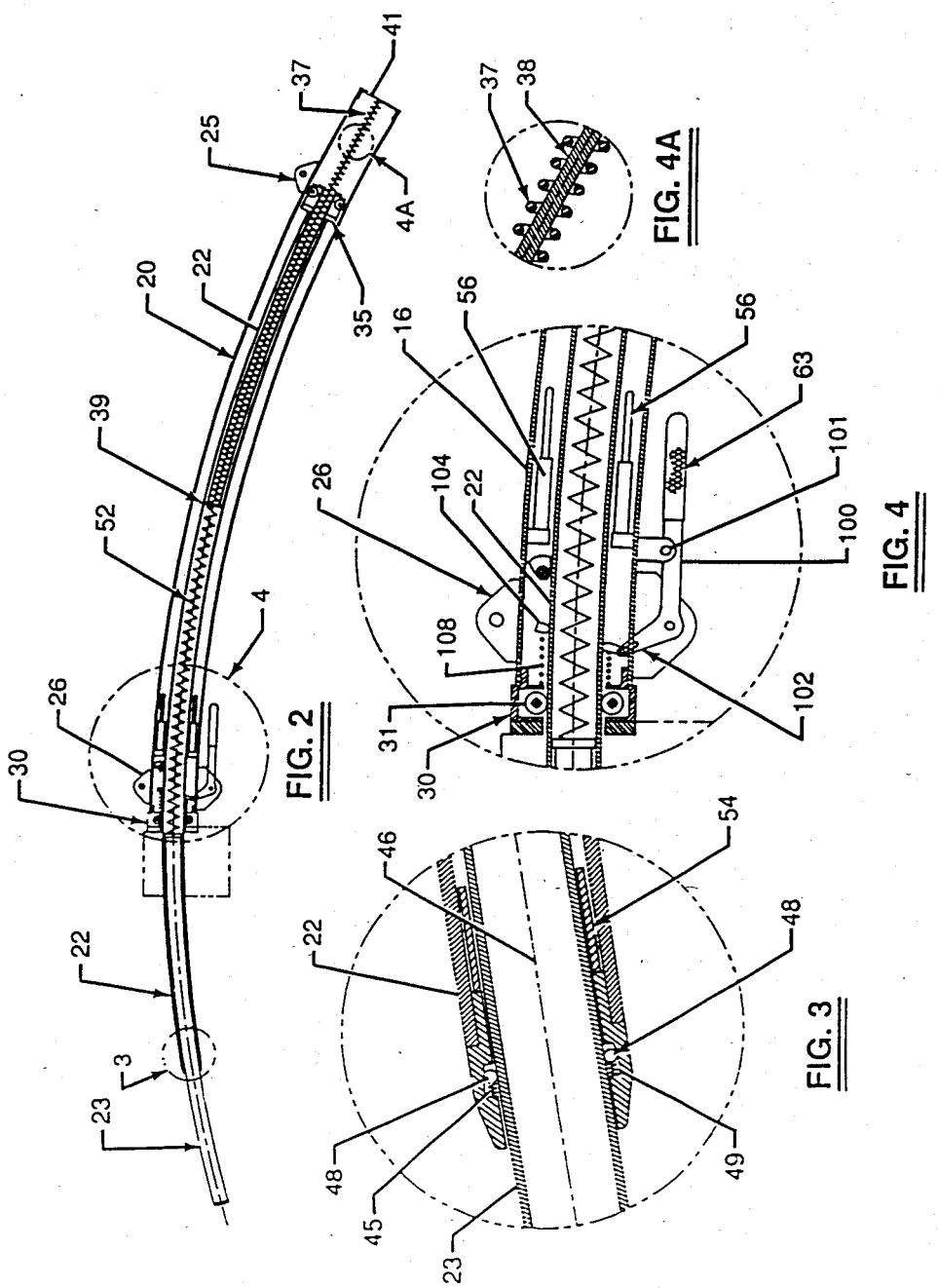

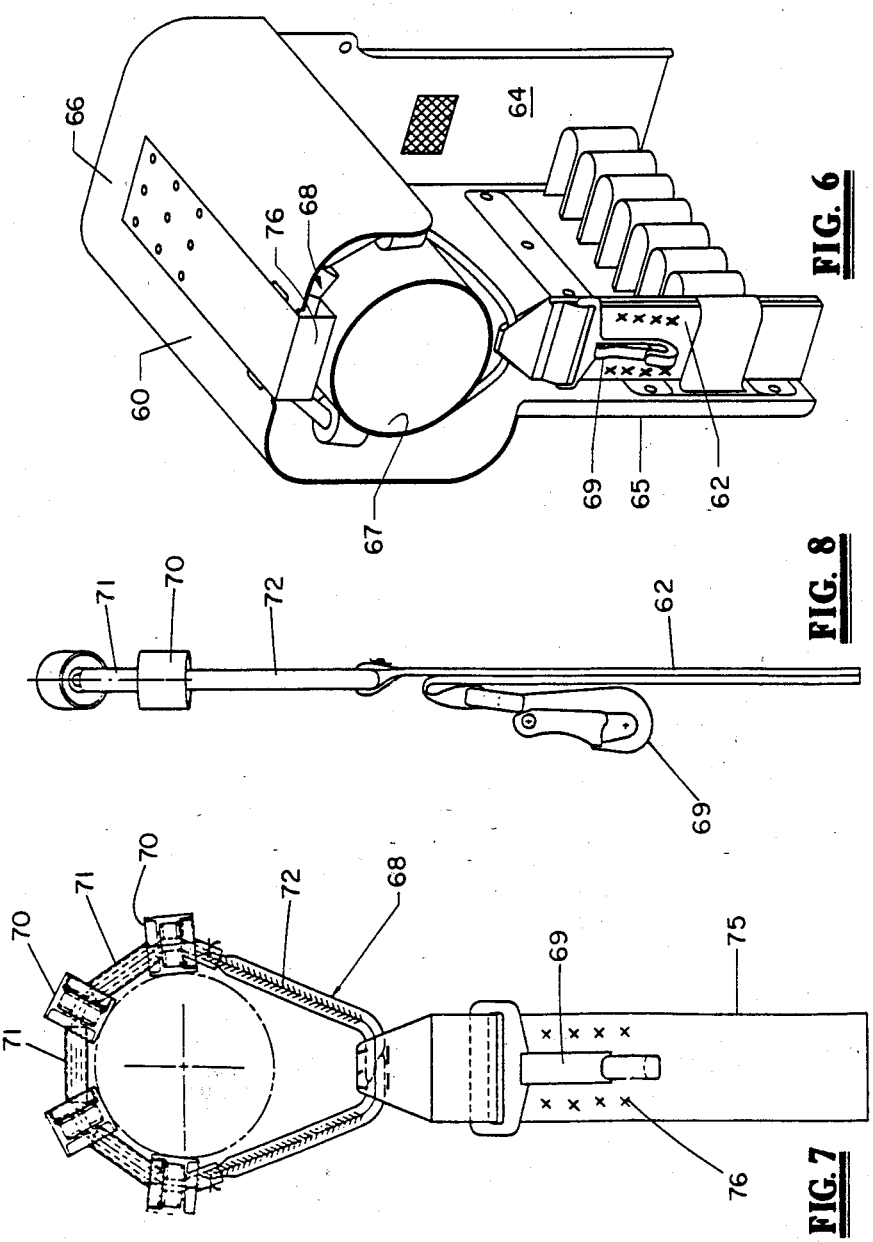

4,887,780

ORBITER ESCAPE POLE

ORIGIN OF THE INVENTION

The invention described herein was made by employees of the United States Government and may be manufactured and used by or for the Government of the United States of America for government purposes without the payment of any royalties thereon or therefor.

BACKGROUND OF THE INVENTION

1. Field of the Invention

This invention relates generally to an escape device for the Space Shuttle Orbiter, and more particularly to a spring actuated telescopic and curved pole mechanism with a lanyard system which can be used to effect an escape from an aircraft without contact with a wing or other structure.

2. Background Art

For aerospace applications, escape devices must be available for various flight conditions. The purpose of this invention is to provide a means of escape from the Space Shuttle Orbiter under certain limited conditions. In the event of an abort or other situation in which the Orbiter would be gliding back to earth and unable to reach a runway, the Orbiter could be forced to ditch in water or on land. Since any non-runway landing is not survivable for the crew, the crew must bail out before impact.

Traditionally, escape systems from moving aircraft involve jumping out a side hatch or by using ejection seats. Because the Orbiter's wing is below and aft of the side hatch, there is a danger of a crew member striking the wing after emergency egress from the side hatch.

A tractor rocket system has been used successfully on some aircraft in the past. The rocket is attached to the crewman's parachute harness by a cord. When the rocket is catupulted out the side hatch by a gas generator, the cord gets taut and the extraction rocket fires and pulls the crew member out the hatch fast enough to clear outboard of the wing. The "g" levels can be high enough to be physically stressing to the crew member.

On the Orbiter, using conventional means of escape, i.e. by simply jumping out of the hatch opening, could mean striking the wing on the way down. Using ejection seats, ejection capsules, or a belly tunnel would require drastic structural and mechanical modifications to the Orbiter. The tractor rocket system has several disadvantages in that it is heavy; it imposes severe "g" loads on the crew member; pyrotechnics are required inside the crew cabin; it requires considerable volume for stowage; requires extensive routing maintenance; and it takes longer to escape.

Other Art made available through a search is as follows:

In U.S. Pat. No. 3,325,125 issued June 13, 1967, a release mechanism is illustrated where a parachute release cable is attached by a collet to a coupling member. By operation of the coupling member, the collet can be released to decouple the coupling member from the cable.

U.S. Pat. No. 1,799,376 issued Apr. 7, 1931 discloses a hinged fender adjacent to the tail of an airplane covering a parachute which pivots to a perpendicular position to avoid a tank from engaging the tail of an airplane.

U.S. Pat. No. 4,437,630 discloses a spraying boom at the rear of an aircraft for aerial spraying.

SUMMARY OF THE INVENTION

An Orbiter type of spacecraft with an escape hatch disposed forwardly and to one side of a wing is provided with an arcuately shaped housing member adapted to be attached to the interior wall of the spacecraft with the open end of the housing member disposed adjacent to the escape hatch. The housing member is rectangular in cross section and contains a telescopically arranged and arcuately shaped primary pole member and extension pole member. The primary pole member is guided at the open end of the housing member by roller members mounted in the housing member at 90° angles from one another. The rearward end of the primary pole member has a roller guide block with three sets of rollers where a first set of rollers engages the side walls of the housing member, the second set of rollers engages the upper and lower walls of the housing member, and the third set of rollers has a roller in engagement with one each of the walls at an offset position relative to a center line.

The extension pole member is slidable and extendible relative to the primary pole member. In assembly, the extension pole member compresses a spring against an internal stop in the primary pole member and the primary pole member compresses a spring against an end stop in the housing member. A latch member at the open end of the housing member engages both pole members through cutout sections in the pole members. The latch member is rotatably mounted on the housing member and when moved to a first position, releases the extension pole member so that the extension spring can extend the extension pole member relative to the primary pole member. The primary pole member has an internal one-way clutch or anti-return mechanism which prevents retraction of the extension pole member from an extended position. A shock absorber means in the primary pole member absorbs the shock from the force of the extension spring. When the latch member is rotated and moved to a second position, the primary pole member is released so that the primary spring extends the primary pole member relative to the housing member. The housing member has a shock absorber means for absorbing the forces of the primary spring on the primary pole member.

A manual backup extension system is provided for extending the primary pole member which includes a canted annular ring which is frictionally in engagement with the primary pole member and biased to the canted position by a spring member. A lever member with a slot and pin connection to the canted ring permits the mechanical manipulation of the canted ring relative to the primary pole member to frictionally engage and move the primary pole member upon operation of the lever member.

The crew escape mechanism includes a magazine containing a number of lanyards or straps where each lanyard is mounted by a roller loop over the primary pole member. Each lanyard is held in place by a spring member on the magazine which engages the end positioned roller loop and by disposing a depending strap portion in a loop holder on the magazine. The strap on the roller loop has stitched overlay portions for controlled release upon release of the stitching, a protection sheath to prevent tangling of lanyards and a hook member on the end of a strap for attachment to a crew harness.

BRIEF DESCRIPTION OF THE DRAWINGS

FIG. 2 shows a diagramatic illustration of a partially extended pole system of the present invention;

FIG. 3 shows an enlarged view of the interconnection of pole members encircled at —3—;

FIG. 4 shows an enlarged view of the manual back-up deployment system encircled at —4—;

FIG. 4A shows an enlarged view of the pole encircled at —4A—;

FIG. 6 is a perspective view of the magazine with a lanyard;

FIG. 7 and FIG. 8 are front and side views of a lanyard and roller loop construction;

DESCRIPTION OF THE PREFERRED EMBODIMENT

Figure 1:
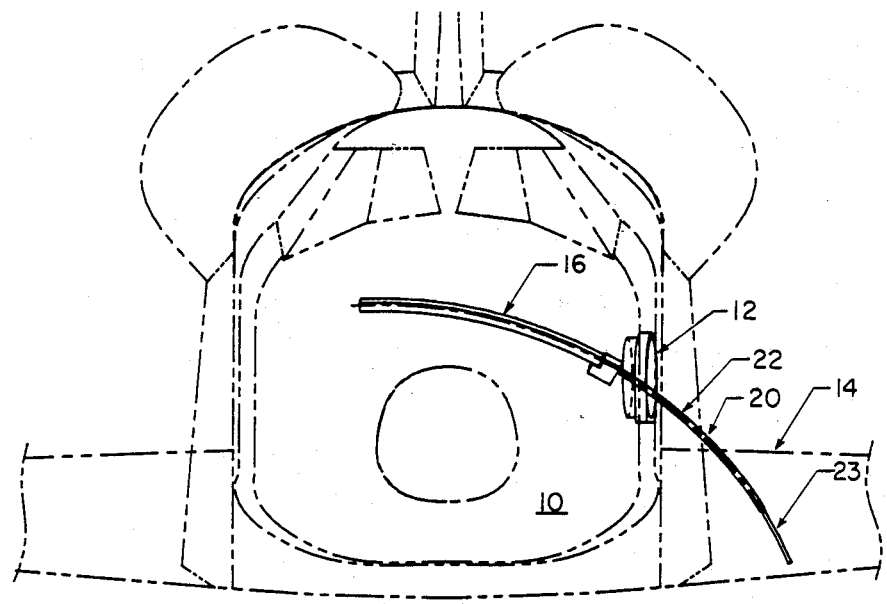
FIG. 1 shows a frontal view in dashed line of part of an Orbiter aircraft with the escape mechanism of the present invention in an extended position.

Referring now to the drawings, in FIG. 1 an Orbiter 10 is partially illustrated in dashed line from a frontal view. On the right hand side of the illustrated Orbiter 10 in the drawing is a side escape hatch opening 12 with a hatch (not shown) which can be jettisoned for escape purposes. The side hatch 12 is located above and forward of a wing 14. If escape is desired during level flight or descent, problems can arise because simply jumping out of the side hatch 12 gives rise to the danger of the crew member striking the wing 14 before clearing the Orbiter.

In the present invention, a telescopic pole assembly 20 with a constant curvature is telescopically disposed in an elongated arcuately curved pole housing 16 which is attachable to an interior wall of the Orbiter 10. In a collapsed position, the extendible poles of the pole assembly 20 are disposed within the housing 16 adjacent to the escape hatch 12.

As shown in an extended position in FIG. 1, the pole assembly 20 has a tubular primary pole or pole member 22 and a tubular extension pole or pole member 23. When fully extended, the extension pole member 23 terminates at a horizontal plane generally aligned near or at the bottom surface of the wing 14. Lanyards (not shown in FIG. 2) are attachable to the parachute harnesses of the crew so the crew members can sequentially slide down the pole members, clear under the wing 14 and have subsequent automatic deployment of a parachute.

In FIG. 2, the principal components of the pole assembly 20 are illustrated. The pole housing 16 has attachment brackets 25, 26 which can be used to pin or otherwise affix the pole housing 16 to a surface wall of the Orbiter 10. The brackets mount the pole assembly 20 pto the Orbiter 10 in a statically determinate mode to accommodate flexing of the Orbiter structure under load.

When in orbit, the pole assembly 20 may be detached from the Orbiter 10 at the brackets 25, 26 and stowed in an out of the way location. At the open end of the pole housing 16 is an outer bearing block assembly 30 which has several internal cavities disposed about a central axis. Roller members 31 are mounted in the cavities (see FIG. 4). The roller members 31 are disposed about the outer circumference of the block assembly 30 and are rotatively mounted to rollingly engage the outer surface of the primary pole member 22. At the end of the primary pole member 22 within the pole housing 16 is an internal bearing block assembly 35. The bearing block assembly 35 is attached to the end of the primary pole member 22 and has several internal cavities disposed about the central axis of the assembly 35. In the internal cavities are roller members which are rotatively mounted to rollingly engage and tangentially contact the lengthwise extending inner surface of the pole housing 16. Thus, the primary pole member 22 is mounted for relative telescopic movement within the pole housing 16. The pole member 22 is movable from a telescopic collapsed position to a fully extended position by a spring member 37. A central rod spring guide 38 (FIG. 4A) precludes buckling of spring member 37. One end of the spring member 37 is contained in the primary pole member 22 by a stop member 39 which is located at approximately the midpoint of the primary pole member 22. The other end of the spring member 37 engages a closure cap member 41 on the pole housing 16.

The extension pole member 23 is tubular and is slidably and telescopically mounted within the primary pole member 22. In the open end of the primary pole member 22 (see FIG. 3) is an annular recess 45 which tapers inwardly and rearwardly toward a central axis 46 in a lengthwise direction. A series of balls 48 are disposed in the recess 45 together with spring means 49 so as to define a one way clutch means. The clutch means permits extension of the extension pole member 23 in one direction relative to the primary pole member 22 but prevents return movement.

As shown in FIG. 3, shock absorber means 54 are provided for absorbing the shock effect of the extension pole 23 moving to a fully extended position.

In FIG. 2, disposed between the stop member 39 in the primary pole member 22 and the inner end of the extension pole member 23 is a spring member 52 for moving the extension pole member 23 from a retracted position to a fully extended position relative to the primary pole member.

As shown in FIG. 4, shock absorber means 56 are provided in the pole housing 16 for absorbing the shock effect of the spring moving the primary pole member 22 to a fully extended position relative to the pole housing 16. For further reference to this type of shock absorber see U.S. Pat. No. 3,603,433.

Figure 5:
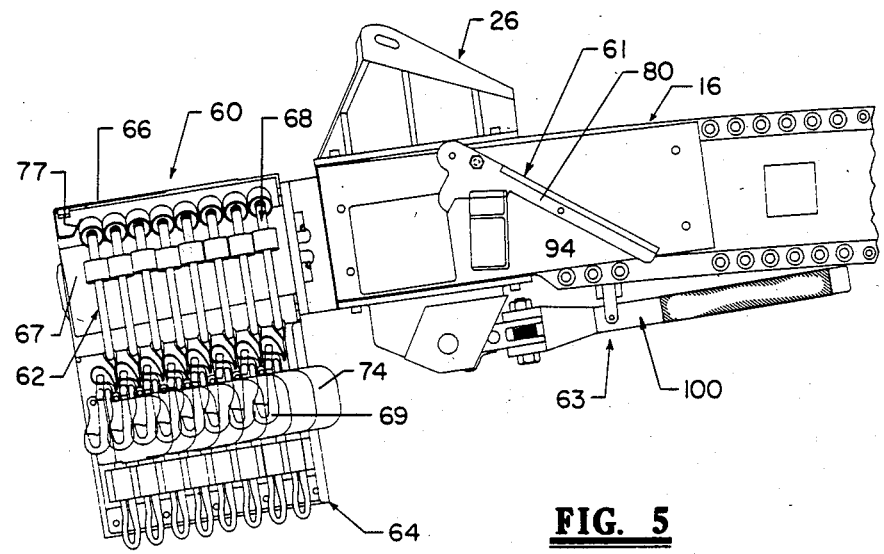
FIG. 5 shows an exterior view of the magazine with lanyards, a triggering mechanism for releasing the pole members, and the manual deployment system.

Referring now to FIG. 5, an external configuration of the magazine or harness connector assembly 60 is illustrated attached to the open end of the pole housing 16. On one surface of the pole housing 16 is an external trigger assembly 61 and on another surface of the pole housing 16 is a manual back-up deployment assembly 63.

As shown in FIGS. 5 and 6, the magazine assembly 60 stores a number of harness connectors or lanyards 62. The magazine assembly 60 includes a backplate 64 for attachment to the end of the pole housing 16, a sideplate 65 and a top cover plate 66. The top cover plate 66 and the sideplate 65 are in the general configuration of a question mark in cross-section with the sideplate 65 offset from a vertical plane extending through the central axis of the pole housing 16 and an attached lanyard storage tube 67. Elastic webbing 68 is arranged in loops near the bottom edge of the sideplate 65 where each loop receives one of the lanyards 62. A lanyard 62 is connected at one end to a roller loop 68 and is connected at an opposite end to a snap hook 69. As shown in FIG. 7 and FIG. 8, the roller loop 68 is a circular supporting structure which includes rollers 70, tubular spacing members 71 and a cord loop 72 where the rollers 70 assist sliding down the poles. The strap member 75 of the Lanyard 62 is folded into layers and fits within a loop of the elastic webbing 68 (see FIG. 5 or FIG. 6). The layers of the strap member 75 are stitched together with KEVLAR thread as shown schematically by the marks 76 on a strap member (see FIG. 7). The stitching is arranged to allow the stitched strap layers to tear apart at the stitches at a constant normal load. The tearing of the stitches provides an energy absorber in the lanyard for high peak loads during transportation down the pole. This shock absorber prevents damage to the pole members and decouples excessive "g" loading on the crew members. The snap hook 69, as illustrated, is attachable to a crew person's harness ring (not shown). Each lanyard 62 is provided with a hook cover 74 of stiff material located on each strap and having sufficient width to cover each hook 69 as well as segregate each lanyard 62 from an adjacent lanyard. Thus, the hooks 69 can only be used in the sequence as assembled in the magazine 60. As a lanyard 62 is removed, a hook cover 74 goes with it exposing the hook 69 on the next lanyard 62. While not shown, a releasable strap can also be employed to retain the lanyards 62 in place, prior to use.

The roller loop 68 consists of four roller bearing assemblies 70 having openings so that the assemblies can be strung on a loop of KEVLAR rope 72. Each roller bearing assembly 70 includes an annular aluminum housing with an annular end plug encasing an annular needle bearing. Teflon washers can be used between the bearing and the housing to minimize friction. Tubular teflon spacers can be used to maintain separation of the rollers in the loop.

As shown in FIG. 6, the top cover plate 66 provides an overall support structure for the magazine 60 and covers the roller loops 68 and the roller bearings to prevent overlapping and tangling of the roller loops 68. On the cover 66 is a dispenser spring element 77 positioned relative to the lanyards 62 so as to retain the eight lanyards 62 on the supporting tubing 67 inside the magazine. After a crew member hooks up to an exposed lanyard 62 and pulls it out of the magazine 60, the spring 77 deflects under the load allowing the roller loop 68 on the lanyard 62 to roll out onto the pole. The spring 77 then returns to its original position and retains the remaining lanyards in position in the magazine 60.

Figure 9:
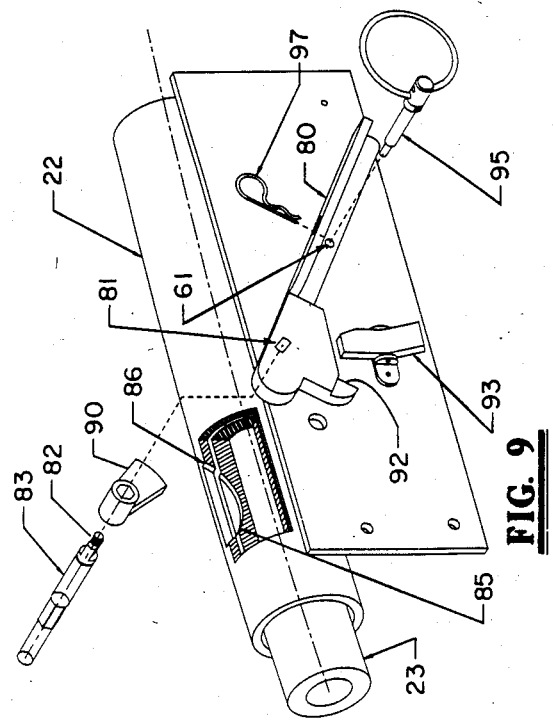
FIG. 9 is an exploded view of the trigger mechanism for the pole members.

Referring now to FIGS. 5 and 9, the trigger mechanism 61 for actuation of the pole members 22 and 23 includes an elongated handle 80 which has a splined opening 81 at one end for receiving a splined shaped end 82 on a trigger shaft 83. The trigger shaft 83 is rotatively mounted in the pole housing 16 in a vertical plane through the central axis of the primary pole 22. The primary pole and the extension pole, respectively, have an aligned curved cutout or keyway notch portion 85, 86 (see FIG. 9). A locking member 90 on the trigger shaft 83 interlocks the pole members 22 and 23 to one another (while the springs are compressed) by fitting into the notch portions 85, 86. Rotating the handle 80 counterclockwise rotates the trigger shaft 83 and releases the locking member 90 from the notch portion 85 for the extension pole 23 while a shoulder 92 on the handle 80 engages a fulcrum switch 93 which temporarily prevents main pole deployment. A switch cover 94 (see FIG. 5) prevents premature actuation of the fulcrum switch 93 (FIG. 9). At this time the extension pole member 23 is extended by the force of the actuating spring. The fulcrum switch 93 (FIG. 9) is then operated or pivoted out of the way of the handle 80 so that the handle 80 can be rotated to move the locking member 90 out of the notch portion 86 on the primary pole member and permit the primary pole member to extend relative to the pole housing 16. An arming pin member 95 (FIG. 9 only) is used as a redundant locking means by releasably interengaging the handle 80, the pole housing 16, the primary pole 22 and the extension pole 23. The arming pin is held in by a hitch pin 97 (FIG. 9 only) prior to the operation.

In the event that the trigger mechanism 61 is operated and the primary pole does not release properly, a back-up manual deployment mechanical assembly 63 is provided. As shown in FIGS. 4 and 5, an elongated lever arm 100 is pivotally connected to the pole housing 16. A slot and pin connection 102 (see FIG. 4) in the lever arm 100 interconnects with a canted annular ring 104. The ring 104 is canted about a line perpendicular to the central axis of the pole member 22 and engages the pole member 22. A spring member 108 is disposed between the bearing block assembly 30 and the canted ring 104. When a pip pin 101 is pulled the lever arm 100 drops down in a position to manually ratchet. When the lever arm 100 drops down, the canted ring 104 moves to the right because of the spring force and the pin and slot connection 102. When the lever arm 100 is rotated counterclockwise, the canted ring 104 grasps the pole 22 by a wedge action and moves the pole 22 to the left. By repeating this action, the pole 22 can be manually extended. The canted ring 104 also prevents retraction of the primary pole member 22 after deployment is accomplished.

Figure 11:
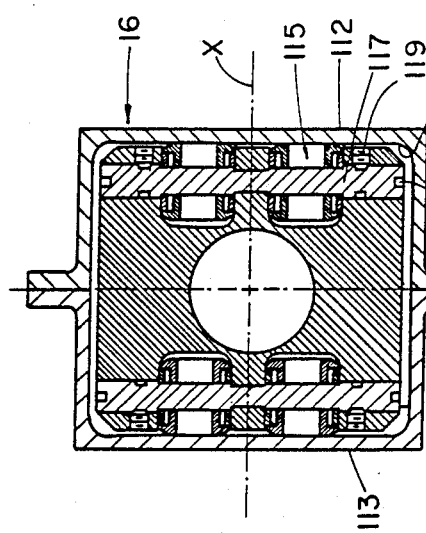
FIG. 11 is a view taken along line 11—11 of FIG. 10.
Figure 10:
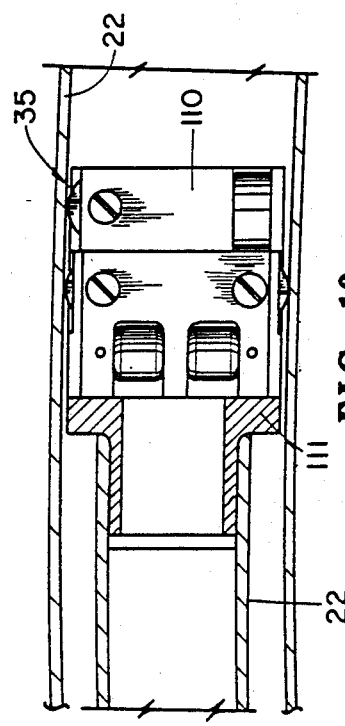
FIG. 10 is a side view of the roller guide construction.

Referring now to FIG. 10, the internal bearing block assembly 35 is illustrated. The assembly 35 includes a rectangularly shaped base housing 110 which is attached by a transition fitting 111 to the primary pole 22. As shown in FIG. 11, the pole housing 16 is rectangular in cross-section and formed by two U-shaped members 112, 113 which have flanges for bolting the members into an assembly. As shown in FIG. 11, X and Y axes intersect at the center of the pole housing and a pair of rollers 115 are disposed to either side of the X and Y axes. Thus, the rollers 115 rollingly engage the inner side walls 116 of the pole housing 16 for handling side loads on the pole 22. Each of the rollers 115 is mounted with bearings on an eccentric pin 117. An eccentric pin has an external key slot 118 by which a pin 117 can be rotated to adjust the spacing of the roller 115 relative to the inner wall 116 of the pole housing 16. A set screw 119 in an annular groove in the pin 117 locks the pin from rotation after adjustment of a roller. Thrust plates are used to protect a roller from thrust loads.

Figure 12:
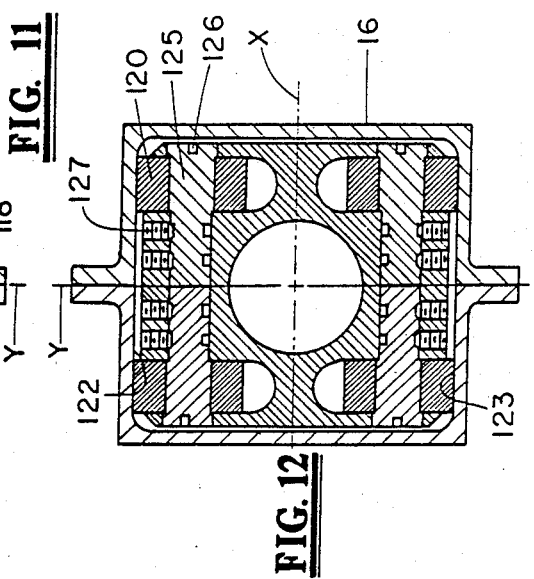
FIG. 12 is a view taken along line 12—12 of FIG. 10.

As shown in FIG. 12, a second pair of rollers 120 is disposed to either side of the X and Y axes so that the rollers 120 frictionally engage the inner upper and lower walls 122, 123 of the pole housing for handling vertical and torsional loads on the pole 22. Each of the rollers 120 is mounted with bearings on an eccentric pin 125. The eccentric pin 125 has an external key slot 126 by which a pin can be rotated to adjust the spacing of the roller relative to the walls of the pole housing 16. A set screw 127 in an annular groove in the pin locks a pin from rotation after adjustments. Thrust plates can be used to protect the roller from thrust loads.

Figure 13:
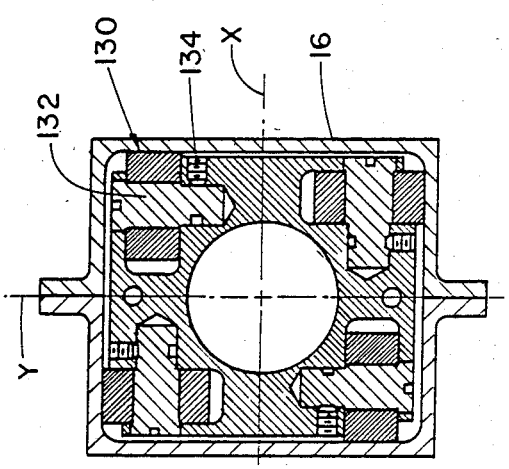
FIG. 13 is a view taken along line 13—13 of FIG. 10.

As shown in FIG. 13, a third set of rollers 130 is disposed with one roller in each of the four quadrants defined by the X and Y axes so that one roller 130 engages each of the inner side, and the bottom and the top walls of the housing for handling torsional loads. The rollers 130 are respectively mounted on eccentric pins 132 with set screws 134 for holding adjustments as described above.

Figure 14:
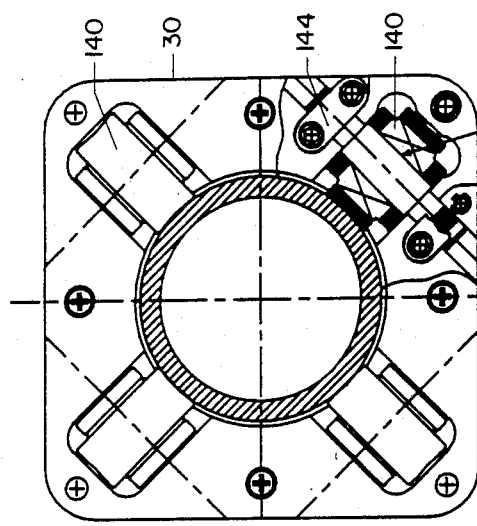
FIGS. 14 and 15 are respectively front and side views of the forward roller guide in the housing.
Figure 15:
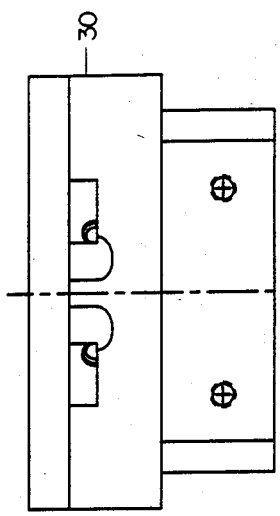

Referring now to FIGS. 14 and 15, the outer bearing block assembly 30 is shown in detail. In the assembly 30, each roller 140 consists of an inner bearing and an outer rim where the inner bearing is mounted on an eccentric pin 142 which can be externally adjusted by rotation. Retainer caps 144 are provided to retain the pins 142 in a fixed location after adjustment. Serrations on the cap and pins serve as a locking mechanism.

Figure 16:
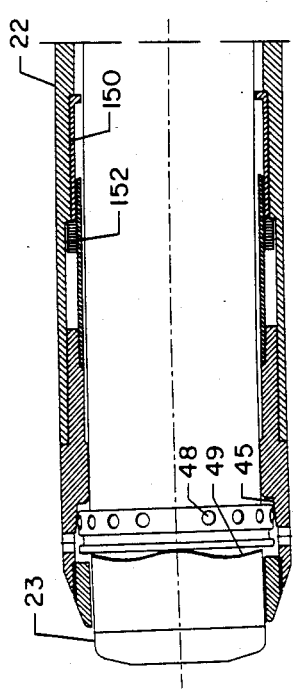
FIG. 16 is a view in cross-section of the end of the primary pole member.

In FIG. 16, the anti-retraction device is illustrated in detail. Steel balls 48 in an annular race member are biased toward the narrow end of the annular recess 45 by a wavy spring member 49. The extension 23 can freely telescope outwards but will resist a retracting force. In the end of the primary pole 22 is an annular impacter sleeve 150 which can slide and strike a push cylinder 152. The push cylinder then will push on friction rings and forces the rings to slide along the friction cylinder. For further reference to this type of energy absorber reference may be made to U.S. Pat. No. 3,603,433.

OPERATION

Initially, the extension pole member 23 compresses a spring 52 against an internal stop 39 in the primary pole member and the primary pole member 22 compresses a spring 37 against an end stop 41 in the pole housing 16. A locking member 90 at the open end of the housing member 16 engages both pole members 22, 23 through notch portions 85, 86 in the pole members. The handle 80 for the locking member 90 is initially held in position by a hitch pin and a locking pin. These pins are removed before the pole can be actuated.

The locking member 90 is rotatably mounted and when moved to a first position (after the pin and the locking pin are removed), functions to release the extension pole member 23 so that the extension spring 52 can extend the extension pole member 23 relative to the primary pole member 22. The primary pole member 22 has an internal one-way clutch or anti-return mechanism (see FIG. 3) which prevents retraction of the extension pole member 23 from an extended position. A shock absorber means 54 in the primary pole member absorbs the shock from the force of the extension spring 52. When the locking member 90 is rotated and moved to a second position, the primary pole member 22 is released so that the primary spring 37 extends the primary pole member 22. The pole housing has a shock absorber means 56 for absorbing the forces of the primary spring 37.

A manual backup system is provided for extending the primary pole member (see FIG. 4) which includes a canted ring 104 which is frictionally in engagement with the primary pole member 22 and biased by a spring member 108. A lever member 100 with a slot and pin connection 102 to the canted ring 104 permits the mechanical manipulation of the canted ring to frictionally engage and move the primary pole member upon operation of the lever member.

When the crew member attaches his/her harness D-ring to the snap ring 69 and bails out, the crew member is attached to the pole by the lanyard will slide down and away from the end of the pole members. Part of the stitching 76 in the lanyard can release to absorb shock loading. When the crew member and lanyard come off the end of the pole he/she is carried under the wing and free of the Orbiter. At this point, automatic deployment sequence for a parachute (not shown) is initiated. A water landing of the crew member automatically triggers a liferaft inflation from the crew members personal crew equipment.

It will be apparent to those skilled in the art that various changes may be made in the invention without departing from the spirit and scope thereof and therefore the invention is not limited by that which is enclosed in the drawings and specifications but only as indicated in the appended claims.

We claim:

1. In an aircraft having an escape hatch located relative to an aircraft protuberance so as to prevent a possibility of crew interference upon use the hatch, an escape device comprising:

an elongated hollow pole housing with a closed end and an open end where said open end is located adjacent to an escape hatch;

an elongated, hollow primary pole member telescopically disposed in said pole housing;

an elongated hollow extension pole member telescopically disposed in said primary pole member;

actuator means for moving said primary pole member and said extension pole member from a contracted position to an extended position;

means for actuating said actuator means for moving said primary pole member and said extension pole member from a contracted position to an extended position;

independent releasable slide members disposed on the open end of said pole housing for encircling said pole members and for selective sliding motion along said pole members when said pole members are in an extended position; and said pole members in an extended position having sufficient length for permitting release of one of said slide members from the terminal end of said pole members so as to prevent interference with said protuberance on said aircraft.

2. The escape device as set forth in claim 1 wherein said pole housing is rectangularly shaped in cross-section and said poles are tubular.

3. The escape device as set forth in claim 2 wherein said pole housing and said pole members have a constant curvature and where said pole housing has a curvature geometrically accommodating the internal wall surface of an aircraft.

4. The escape device as set forth in claim 3 and further including means disposed on said pole housing for absorbing shock forces upon extension of said primary pole member.

5. The escape device as set forth in claim 4 and further including means disposed between said primary pole member and said extension pole member for absorbing shock forces upon extension of said extension pole member.

6. The escape device as set forth in claim 5 and further including one-way clutch means for locking said pole members to one another when in an extended position.

7. The escape device as set forth in claim 6 and further including manual actuator means disposed on said pole housing and engagable with said primary pole member for manually moving said primary pole member relative to said pole housing.

8. The escape device as set forth in claim 7 wherein said manual actuator means includes an annular and canted ring member disposed about the primary pole member, an actuator arm member pivotally attached to said canted ring member, and a spring means for biasing said canted ring member relative to said pole housing, said canted ring member also serving to preclude retraction of said primary pole member from an extended position.

9. The escape device as set forth in claim 7 and further including first roller means on said pole housing for engaging the outer surface of said primary pole member at the open end of said pole housing and second roller means on said primary pole member for engaging the inner surface of said pole housing.

10. The escape device as set forth in claim 3 wherein said actuator means are spring members and said means for actuating said actuator means including a rotatively mounted locking element for selectively interengaging and releasing with respect to recesses in said pole members.

11. The escape device as set forth in claim 3 and further including manual actuator means disposed on said pole housing and engagable with said primary pole member for manually moving said primary pole member relative to said pole housing.

12. The escape device as set forth in claim 11 wherein said manual actuator means includes a canted ring member disposed about said primary pole member and attached by a pin and slot connection to a lever, and spring means for biasing said ring member whereby said ring member can be manipulated by said lever for moving said primary pole member.

13. The escape device as set forth in claim 3 and further including first roller means on said pole housing for engaging the outer surface of said primary pole member at the open end of said pole housing and second roller means on said primary pole member for engaging the inner surface of said pole housing.

14. The escape device as set forth in claim 3 wherein said slide members include a roller loop means for engaging said pole members, a strap member attached to said roller loop means for coupling with a harness.

15. The escape device as set forth in claim 14 wherein said strap member is folded in layers and the layers stitched to one another for providing uniform tearing force when subjected to a loading force.

16. The escape device as set forth in claim 15 wherein said strap members have hook means and a panel covering for separating said hook means from one another and precluding taking a lanyard out of sequence.

17. The escape device as set forth in claim 15 wherein said slide members are disposed in a frame member and loop means on said frame member for receiving said strap members.

18. The escape device as set forth in claim 13 wherein said second roller means includes a first set of roller means for engaging side walls of said pole housing, a second set of roller means for engaging top and bottom walls of said pole housing and a third set of roller means for engaging each of said wall surfaces.

19. A method for providing an escape system for crew members in an Orbiter where the Orbiter cannot be landed on a runway including the steps of:

attaching an elongated geometrically accommodating curved pole housing member in an Orbiter and locating the pole housing member relative to an escape hatch in the Orbiter where the open end of the pole housing assembly is located adjacent to the escape hatch and includes a telescoped and curved extension pole member and a curved primary pole member within said curved pole housing member and also includes a lanyard assembly having individual lanyards for each crew member disposed in a rolling relationship to said pole members, opening the escape hatch and actuating a spring operated extension system for projecting the extension pole member and the primary pole member through the escape hatch, where the extension pole member and the primary pole member are telescopically extended relative to one another while remaining attached to said pole housing member and while preventing the pole members from retracting from an extended position and where a terminal end of the extension pole member is located relative to the Orbiter to permit deployment of a crew member free of contact with the Orbiter, coupling a crew member escape strap to a lanyard so that the crew member can rollingly move along the telescopically extended pole members to escape contact with the Orbiter.

20. The method as set forth in claim 19 wherein the lanyard includes a folded and stitched strap member which can provide a uniform tearing force during use.

21. The method as set forth in claim 19 and further including the step of manually actuating the projection of the extension pole system and the primary pole system in the event the spring operated extension system fails.

22. The method as set forth in claim 19 and further including the step of removing locking pins from the spring operated extension system prior to actuation.

* * * * *